P. A. HOFMANN.
KNIFE AND FORK SCOURERS.
No. 195,009. Patented Sept. 11, 1877.
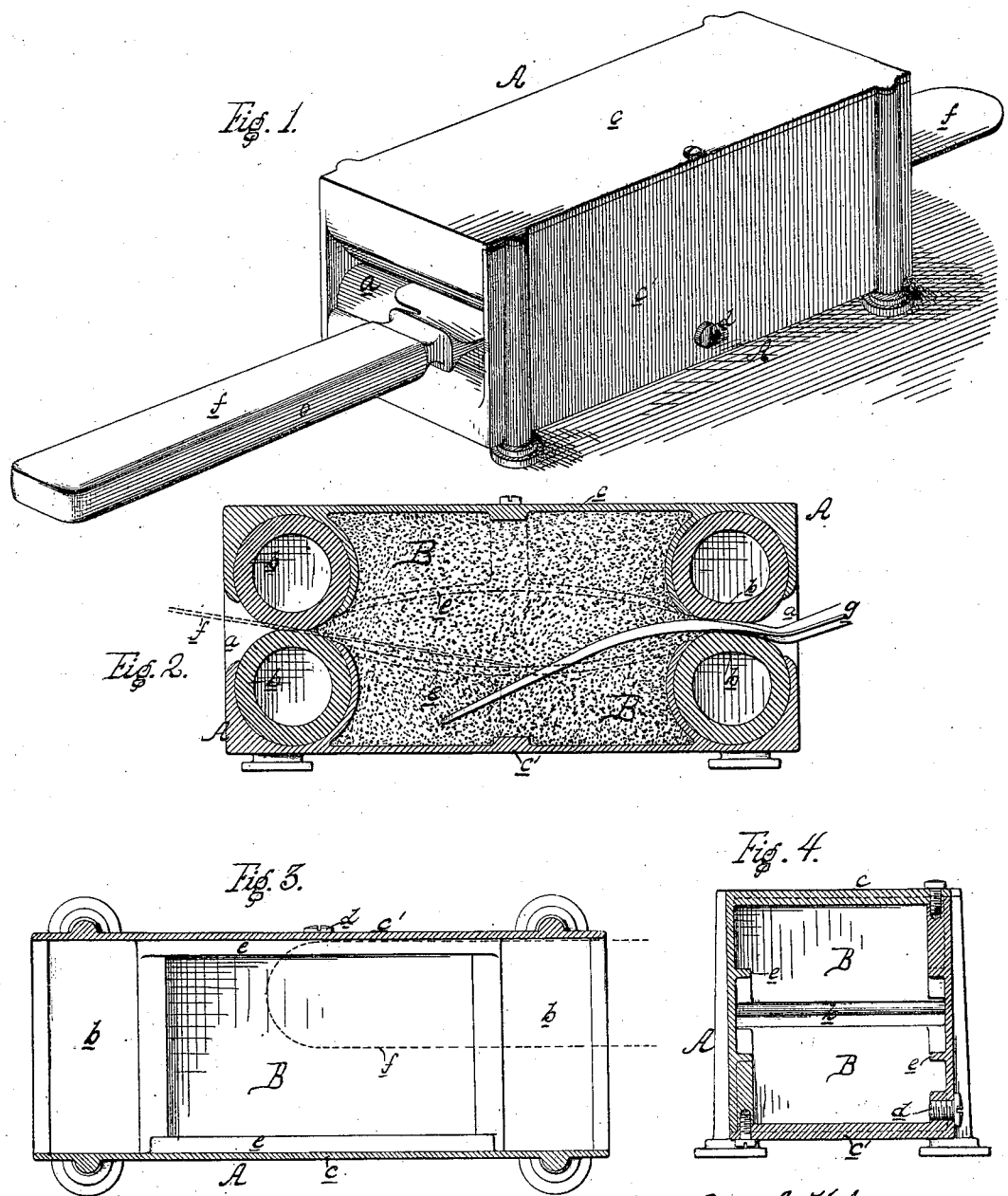

UNITED STATES PATENT OFFICE.

PETER A. HOFMANN, OF PHILADELPHIA, PENNSYLVANIA.

IMPROVEMENT IN KNIFE AND FORK SCOURERS.

Specification forming part of Letters Patent No. 195,009, dated September 11, 1877; application filed June 2, 1877.

*To all whom it may concern:*

Be it known that I, PETER A. HOFMANN, of Philadelphia, county of Philadelphia, and State of Pennsylvania, have invented new and useful Improvements in Knife and Fork Scourers, of which the following is a specification:

The object of my invention is a neat and efficient utensil with which to scour or polish knives and forks, the apparatus being too fully described hereinafter to need preliminary description here.

In the accompanying drawings, Figure 1 is a perspective view of my improved knife and fork scourer; Fig. 2, a longitudinal section of the same; Fig. 3, a sectional plan; Fig. 4, a transverse section; and Fig. 5, an enlarged sectional view.

A is a box. In the ends of the same are open spaces $a$, closed by pieces of tubular gum $b$, which prevent the emery or other polishing material from escaping from the space B, the gum being confined within recesses formed in the box. The box A is made in two pieces, $c$ $c'$, connected together by screws, and being preferably made only long enough to admit the prongs and part of the shank of a fork, as shown in the longitudinal section, Fig. 2. In one of the sides of the box is an opening, closed by a screw, $d$, through which the box A can be emptied or filled with the scouring or polishing material. Formed on the inside of the box are curved guides $e$, extending the whole length of the space B, for a purpose described hereinafter.

The operation of my improved knife and fork scourer is as follows: The knife $f$ is inserted in one of the ends of the box A, with the back of the knife against the side of the box, (see Fig. 3,) and pushed through to the opposite end, when it can be moved backward and forward as much as may be desirable, or as much as the condition of the knife may demand. The knife is guided to the opposite opening of the box by the guides $e$, as shown by dotted lines in Fig. 2. The polishing operation is somewhat facilitated by the particles of scouring material becoming attached to the gum pieces $b$. In scouring a fork, the fork $g$ is inserted in one end, but does not extend through to the other end, and then moved in and out. The space between the prongs of the fork is very nearly filled by the gum pieces $b$ being pressed down in between the prongs, and, the interstices being filled with the polishing or scouring material, all parts of the fork are thereby scoured. (See enlarged sectional view, Fig. 5.)

It will be evident that, while the tubular gum pieces $b$ are confined in recesses within the box, which prevent any movement of the same, and bear against each other, the entrance of the knife or fork to the space B is comparatively easy, owing to the yielding nature of the tubular gum pieces. By confining the tubular gum pieces in the manner described there are no openings left for the escape of the scouring or polishing material, and the box A can be made compact and neat.

What I claim as my invention is—

1. The combination, with the box A and its open ends, of the tubular gum pieces $b$, confined in recesses within the box, substantially as described.

2. The combination, with the box A and the two sets of gum pieces $b$, of the guides $e$.

In testimony whereof I have signed my name to this specification in the presence of two subscribing witnesses.

PETER A. HOFMANN.

Witnesses:
 GEO. W. WARD,
 C. J. HOFMANN.